United States Patent
Shih et al.

(10) Patent No.: US 9,728,298 B2
(45) Date of Patent: Aug. 8, 2017

(54) RADIATION CROSSLINKED FLUOROPOLYMER COMPOSITIONS CONTAINING LOW LEVEL OF EXTRACTABLE FLUORIDES

(71) Applicant: Daikin America, Inc., Orangeburg, NY (US)

(72) Inventors: Keith S Shih, Decatur, AL (US); Ronald E Hendershot, Decatur, AL (US); George Lin, Decatur, AL (US)

(73) Assignee: Daikin America, Inc., Orangeburg, NY (US)

( * ) Notice: Subject to any disclaimer, the term of this patent is extended or adjusted under 35 U.S.C. 154(b) by 0 days.

(21) Appl. No.: 14/751,345

(22) Filed: Jun. 26, 2015

(65) Prior Publication Data

US 2016/0379734 A1   Dec. 29, 2016

(51) Int. Cl.
| | |
|---|---|
| C08F 2/46 | (2006.01) |
| C08F 2/50 | (2006.01) |
| C08G 61/04 | (2006.01) |
| H01B 3/44 | (2006.01) |
| C08J 3/22 | (2006.01) |
| C08J 3/24 | (2006.01) |
| C08J 3/28 | (2006.01) |
| C08J 7/12 | (2006.01) |
| C08K 3/22 | (2006.01) |
| C08K 5/00 | (2006.01) |
| H01B 3/00 | (2006.01) |
| H01B 7/29 | (2006.01) |

(52) U.S. Cl.
CPC ............ H01B 3/441 (2013.01); C08J 3/226 (2013.01); C08J 3/24 (2013.01); C08J 3/28 (2013.01); C08J 7/123 (2013.01); C08K 3/22 (2013.01); C08K 5/0025 (2013.01); H01B 3/004 (2013.01); H01B 3/445 (2013.01); H01B 7/292 (2013.01); C08J 2323/08 (2013.01); C08J 2327/18 (2013.01); C08J 2423/08 (2013.01); C08J 2427/18 (2013.01); C08K 2003/222 (2013.01); C08K 2003/2296 (2013.01)

(58) Field of Classification Search
CPC ........ H01B 3/441; H01B 3/004; H01B 3/445; H01B 7/292
USPC ................ 522/81, 71, 1, 189, 184, 6; 520/1
See application file for complete search history.

(56) References Cited

U.S. PATENT DOCUMENTS

| | | | |
|---|---|---|---|
| 3,893,971 A | 7/1975 | Ukihashi | |
| 4,028,431 A | 6/1977 | Futami | |
| 4,110,308 A | 8/1978 | Abe | |
| 4,260,698 A | 4/1981 | Tatemoto | |
| 4,495,247 A | 1/1985 | Vasta | |
| 4,637,955 A * | 1/1987 | Glaister ................ | H01B 3/445 174/110 F |
| 5,480,930 A | 1/1996 | Gentle | |
| 5,527,612 A * | 6/1996 | Ohta ...................... | C08L 23/08 174/110 FC |
| 5,582,917 A | 12/1996 | Chen | |
| 5,700,861 A | 12/1997 | Tomihashi | |
| 5,824,416 A | 10/1998 | Chen | |
| 5,858,540 A | 1/1999 | Hayami | |
| 6,020,440 A | 2/2000 | Tabb | |
| 6,325,752 B1 | 12/2001 | Tomihashi | |
| 2002/0061364 A1 | 5/2002 | Badesha | |
| 2004/0072959 A1 | 4/2004 | Grootaert | |
| 2005/0187328 A1 | 8/2005 | Globus | |
| 2006/0041064 A1 | 2/2006 | Gornowicz | |
| 2007/0069187 A1 | 3/2007 | Tonge | |
| 2007/0203281 A1 | 8/2007 | Alric | |
| 2008/0121725 A1 | 5/2008 | Nomura | |
| 2008/0300365 A1 | 12/2008 | Ohtani | |
| 2009/0011164 A1 | 1/2009 | Masuda | |
| 2009/0048359 A1 | 2/2009 | Glew | |
| 2014/0135438 A1 | 5/2014 | Umino | |
| 2014/0148528 A1 * | 5/2014 | Zerafati .................. | C08K 3/22 523/300 |
| 2014/0288226 A1 | 9/2014 | Ota | |
| 2014/0377558 A1 * | 12/2014 | Mizuno .................. | C08L 23/08 428/394 |

FOREIGN PATENT DOCUMENTS

| | | |
|---|---|---|
| JP | S63 265943 | 11/1988 |
| JP | H06 36618 | 2/1994 |
| RU | 2414762 | 3/2011 |
| WO | 9117206 | 11/1991 |
| WO | 9307627 | 4/1993 |
| WO | 2013-146704 | * 10/2013 |

OTHER PUBLICATIONS

Masson, Patrick "International Search Report and Written Opinion—International Application No. PCT/US2016/039337" European Patent Office; Sep. 8, 2016; pp. 1-14.

(Continued)

*Primary Examiner* — Jessica E Whiteley
(74) *Attorney, Agent, or Firm* — Nicholas J. Landau; Bradley Arant Boult Cummings LLP (57) ABSTRACT

A composition for manufacturing a crosslinked ethylene tetrafluoroethylene (ETFE) copolymer with enhanced abrasion resistance and heat resistance is provided, the composition including ETFE, about 0.1-10% w/w of a metal oxide that effectively scavenges high levels of fluoride ions; and a crosslinking agent. Methods of using and making the composition are also provided.

24 Claims, 3 Drawing Sheets

(56) References Cited

OTHER PUBLICATIONS

Morelli, et al. "The Thermal Oxidative Degradation of an Ethylene-Tetrafluoroethylene-Copolymer-Based Electrical Wire Insulation" Journal of Applied Polymer Science, vol. 43, No. 3; Aug. 5, 1991; pp. 601-611.

Morelli, John J. et al. The Thermal Oxidative Degradation of an Ethylene-tetrafluoroethylene-coploymer-based electrical wire Insulation, Journal of Applied Polymer Science, vol. 43, Issue 3, p. 601-611, Aug. 5, 1991.

* cited by examiner

RADIATION CROSSLINKED FLUOROPOLYMER COMPOSITIONS CONTAINING LOW LEVEL OF EXTRACTABLE FLUORIDES

BACKGROUND

A. Field of the Disclosure

The present disclosure relates generally to polymer formulations. Such polymers as well as methods of their use and methods of their making are provided.

B. Background

Ethylene-tetrafluoroethylene (ETFE) copolymers have a wide variety of useful applications. They have good structural strength, a relatively high melting temperature, and excellent chemical, electrical and high energy radiation resistance properties. ETFE has good structural durability and heat resistance, having a tensile strength of 6100 psi (42 N mm$^{-2}$), with a working temperature range of −184° C. to +150° C.

ETFE is an excellent material both as the jacketing and primary insulator of electrical cables. Because of its properties ETFE can be used in high stress and high reliability situations. This includes, but is not limited to, aircraft and spacecraft wiring.

The resistance of ETFE to heat and abrasion can be further improved by crosslinking the copolymer. The crosslinking is achieved in various ways. The highest levels of heat and abrasion resistance are achieved by crosslinking by adding a crosslinking agent and irradiating the ETFE copolymer with high-energy ionizing radiation. Unfortunately, during the crosslinking process, hydrogen fluoride (HF) gas is released. Hydrogen fluoride is highly corrosive, and readily damages wiring and other metallic parts. Irradiation with high-energy ionizing radiation releases high concentrations of HF from the ETFE copolymer. Attempts have been made to subject the crosslinked ETFE coated wire cable to a heat treatment to drive the HF off the coating. However, to date these efforts have proven ineffective. There is a long-felt need in the art for a way to reduce the amount of residual HF in crosslinked ETFE after crosslinking with high-energy ionizing radiation.

SUMMARY

The following presents a simplified summary in order to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

It has been unexpectedly discovered that certain metal oxides are effective to scavenge HF, even under the demanding conditions of radiation mediated crosslinking of ETFE.

The disclosure provides a composition for manufacturing a crosslinked ETFE copolymer with enhanced abrasion resistance and heat resistance, the composition comprising: ETFE; about 0.1-10% w/w of a metal oxide selected from the group consisting of ZnO and MgO; and a crosslinking agent.

The disclosure further provides a method of making a crosslinked ETFE copolymer with enhanced abrasion resistance and heat resistance, the method comprising: providing the composition disclosed above; and exposing the composition to at least about 5 Mrad (50 kGy) ionizing radiation; wherein the level of extractable fluoride ions in the crosslinked ETFE copolymer is less than about 150 ppm w/w. Also provided is a crosslinked ETFE copolymer that is the product of this method, having enhanced abrasion resistance, enhanced heat resistance, and a level of extractable fluoride ions that is less than about 150 ppm w/w.

The disclosure further provides a method of making a jacket for a conducting wire with enhanced abrasion resistance and heat resistance, the method comprising: providing the composition disclosed above; extruding the composition into the shape of the jacket; and crosslinking the composition by exposing the composition to at least about 5 Mrad (50 kGy) ionizing radiation to produce a crosslinked ETFE copolymer; wherein the level of extractable fluoride ions in the crosslinked ETFE copolymer is less than about 150 ppm w/w. Also provided is the jacket for a conducting wire that is the product of this method, the jacket having enhanced abrasion resistance, enhanced heat resistance, and a level of extractable fluoride ions that is less than about 150 ppm w/w.

The disclosure further provides a method of making a primary insulator for a conducting wire with enhanced abrasion resistance and heat resistance, the method comprising: providing the composition disclosed above; applying the composition to the wire; and crosslinking the composition by exposing the composition to at least about 5 Mrad (50 kGy) ionizing radiation to produce a crosslinked ethylene tetrafluoroethylene copolymer; wherein the level of extractable fluoride ions in the crosslinked ETFE copolymer is less than about 150 ppm w/w. Also provided is the primary insulator made by this method, the primary insulator having enhanced abrasion resistance, enhanced heat resistance, and a level of extractable fluoride ions that is less than about 150 ppm w/w.

Further provided is a concentrate for making a crosslinked ETFE copolymer, the concentrate comprising: about 12.5-50% w/w of a metal oxide selected from the group consisting of ZnO and MgO; and ETFE.

A method of making a crosslinked ETFE is further provided, the method comprising providing the above concentrate; diluting the concentrate with diluent ETFE to the point at which the metal oxide concentration is about 0.1-10% w/w, to make a diluted composition; and exposing the diluted composition to at least 5 Mrad (50 kGy) ionizing radiation; wherein the level of extractable fluoride ions in the crosslinked ETFE copolymer is less than about 150 ppm w/w.

DETAILED DESCRIPTION

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the propulsion unit is positioned for normal operation (i.e., right side up).

The terms "first" and "second" are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

The terms "about" or "approximately" mean within a range of reasonable error around a central value. Such reasonable error may for example stem from the precision of an instrument or method used to measure the value. The error could also stem from the precision of a method of making a component of a device. Specific examples of such limits of reasonable error are 20%, 10%, 5%, 2.5%, and 1%. Unless specified otherwise, all numerical values may be approximate.

B. Composition for Manufacturing a Crosslinked ETFE Copolymer

A composition for manufacturing a crosslinked ETFE copolymer with enhanced abrasion resistance and heat resistance is provided, the composition comprising: ETFE; about 0.1-10% w/w of a metal oxide; and a crosslinking agent.

The ETFE is composed of monomers of ethylene ($CH_2CH_2$) and tetrafluoroethylene ($CF_2CF_2$) in various proportions. Like all copolymers, its properties and molecular weight can be varied by varying the relative compositions of the ethylene and tetrafluoroethylene, as is within the capabilities of one of ordinary skill in the art.

The metal oxide functions to react with undesirable fluoride ions during crosslinking ("scavenging"). In some embodiments of the composition the metal oxide is selected from the group consisting of ZnO and MgO. These oxides have been discovered to have excellent fluoride ion scavenging properties, even at the extremely high levels of fluoride ion production that occur during the radiologic crosslinking of ETFE copolymers. However, it has been discovered that not all metal oxides that are presently used as fluoride ion scavengers under other conditions are suitable for use during the radiologic crosslinking of ETFE copolymers. For example, antimony oxide ($Sb_2O_3$) is suitable as a fluoride ion scavenger under conditions of low or moderate fluoride ion production, but as illustrated in the below example $Sb_2O_3$ performs poorly as a fluoride ion scavenger during the radiologic crosslinking of ETFE copolymers; thus in some embodiments of the composition the metal oxide is not $Sb_2O_3$. Other oxides that scavenge fluoride ions include calcium oxide, titanium oxide, hydrotalcite ($Mg_6Al_2CO_3(OH)_{16}\cdot 4(H_2O)$), lead oxide, lead phosphate, and $PbHPO_3$.

In some embodiments of the composition the crosslinking agent is triallyl isocyanurate (1,3,5-triallyl-1,3,5-triazinane-2,4,6-trione—TAIC). TAIC is used as a crosslinking agent for rubber products and plastics products. TAIC is a waxy solid with a low vapor pressure that is not flammable. TAIC has a moderate water solubility of 3.5 g $L^{-1}$. TAIC is useful to catalyze crosslinking in the presence of ionizing radiation to create an abrasion-resistant and heat-resistant crosslinked ETFE copolymer. It has the following structure TAIC may be present in the composition at any concentration that is effective to product crosslinking during exposure to ionizing radiation. In some embodiments of the composition, TAIC is present at a concentration of about 1-10% w/w. In further embodiments, TAIC is present at a concentration of about 3-7% w/w. In still further embodiments, TAIC is present at a concentration of about 5% w/w.

The metal oxide may be present at any concentration that effectively scavenges HF during irradiation crosslinking. In some embodiments of the composition, the metal oxide is present at a concentration effective to reduce extractable HF to about 150 ppm or less during radiologic curing. In some embodiments of the composition the metal oxide is present at concentrations of about 0.1-8% w/w. In further embodiments of the composition the metal oxide is present at a concentration of about at least about 2.5% w/w. In still further embodiments, the metal oxide is present at a concentration of about 2.5-5.0% w/w. In a specific embodiment, the metal oxide is present at about 5% w/w.

In some cases is may be desired to add a pigment to the composition, to achieve certain coloration. The coloration may be indicative of the properties or intended uses of a wire that is jacketed by a crosslinked ETFE copolymer. The pigment may function to protect the crosslinked composition from radiation incidental to its use, for example ultraviolet radiation that might be incidental to outdoor use. It is advantageous if the pigment retains its pigmenting characteristics after exposure to ionizing radiation. Some embodiments of the pigment retain its pigmenting characteristics after exposure to at least about 5 Mrad (50 kGy). Further embodiments of the pigment retain its pigmenting characteristics after exposure to at least about 10 Mrad (100 kGy). Still further embodiments of the pigment retain its pigmenting characteristics after exposure to at least about 20 Mrad (200 kGy). In a specific embodiment the pigment is $TiO_2$.

C. Method of Making Crosslinked ETFE Copolymer

A method of making a crosslinked ethylene tetrafluoroethylene (ETFE) copolymer with enhanced abrasion resistance and heat resistance is provided, the method comprising: providing any of the compositions as described in the previous section; and exposing the composition to at least about 5 Mrad (50 kGy) ionizing radiation; wherein the level of extractable fluoride ions in the crosslinked ETFE copolymer is less than about 150 ppm w/w.

In the context of this disclosure, any reference to levels of extractable fluoride ions in a crosslinked ETFE copolymer refers to levels as measured by the following protocol. A piece of crosslinked ETFE of between 1.0-1.2 g is placed into a 60 mL polypropylene wide mouth bottle. 20 mL of deionized (DI) water is introduced into the jar. Each wide mouth bottle is then tightly capped and maintained at 70° C. After 7 days (168 hours) at 70° C., the bottle is allowed to cool down to room temperature, and 20 mL of "total ionic strength adjustment buffer 2" (or TISAB II from Ricca Chemical Company, Arlington, Tex.) is added to the bottle. The $F^-$ ion concentration determination is carried out using a fluoride ion selective electrode or ISE (Model DC219-F by Mettler-Toledo, Columbus, Ohio). The ion selective electrode is connected to a multi-purpose pH meter (Model Seven Multi by Mettler-Toledo, Columbus, Ohio) for measurements. Manufacturer recommended procedures were followed to calibrate the electrode using commercially obtained fluoride standards (Thermo-Fisher Scientific, Chelmsford, Mass.) before use.

The ionizing radiation may be any type that is effective to crosslink ETFE. In some embodiments of the method, the ionizing radiation is electron radiation. In further embodiments, the ionizing radiation is high-energy electron radiation. In this context, high-energy electron radiation refers to electron radiation of above about 0.1 MeV. In a specific embodiment of the method the high-energy electron radiation is at least 0.8 MeV. The source of the electron radiation may be, for example, an electron beam. In an alternative embodiment, the ionizing radiation is γ radiation.

The dosage of radiation used to crosslink the ETFE copolymer must be substantial to produce the desired level of crosslinking. In some embodiments of the method the composition is exposed to about 5-25 Mrad (50-250 kGy) of the ionizing radiation. In further embodiments the composition is exposed to about 10-20 Mrad (100-200 kGy) of the ionizing radiation. In specific embodiments, the composition is exposed to about 10 or about 20 Mrad (100 or 200 kGy) of the ionizing radiation.

The level of extractable fluoride in the crosslinked ETFE copolymer (measured as described above) will ideally be sufficiently low to prevent damage to nearby structures, such as a metal wire. In some embodiments of the method, the level of extractable fluoride ions in the crosslinked ETFE copolymer is less than about 80 ppm w/w. In further embodiments of the method, the level of extractable fluoride ions in the crosslinked ETFE copolymer is less than about 60 ppm w/w. In yet further embodiments of the method, the level of extractable fluoride ions in the crosslinked ETFE copolymer is less than about 20 ppm w/w. In still further embodiments of the method, the level of extractable fluoride ions in the crosslinked ETFE copolymer is less than about 10 ppm w/w. In a specific embodiment of the method, the level of extractable fluoride ions in the crosslinked ETFE copolymer is less than about 5 ppm w/w.

A crosslinked ETFE copolymer with enhanced abrasion resistance and heat resistance that is the product of any of the above processes is also provided, in which the crosslinked ETFE copolymer has a level of extractable fluoride ions as also described above.

D. Methods of Making Jackets and Primary Insulators

The crosslinked ETFE copolymers disclosed above are of particular utility as jacketing and primary insulation for electrically conducting wire. The low levels of extractable fluoride ions prevent corrosion of the metal wire, while still allowing high levels of crosslinking caused by high-intensity ionizing radiation.

A method of making a jacket for a conducting wire with enhanced abrasion resistance and heat resistance is provided, the method comprising: providing any of the compositions for manufacturing crosslinked ETFE copolymers provided above; extruding the composition into the shape of the jacket; and crosslinking the composition by exposing the composition to at least about 5 Mrad (50 kGy) ionizing radiation to produce a crosslinked ETFE copolymer; wherein the level of extractable fluoride ions in the crosslinked ETFE copolymer is less than about 150 ppm w/w. The method of extrusion may be any that is known to be suitable in the art for making such jacketing.

A method of making a primary insulator for a conducting wire with enhanced abrasion resistance and heat resistance is provided, the method comprising: providing any of the compositions for manufacturing the crosslinked ETFE provided herein; applying the composition to the wire; and crosslinking the composition by exposing the composition to at least about 5 Mrad (50 kGy) ionizing radiation to produce a crosslinked ETFE copolymer; wherein the level of extractable fluoride ions in the crosslinked ETFE copolymer is less than about 150 ppm w/w In each of the methods provided in this section, the radiation may be of any type or dose that is disclosed above as suitable for the method of making the crosslinked ETFE copolymer. In addition, the levels of extractable fluoride ions may be any that is disclosed above as suitable for the method of making the crosslinked ETFE copolymer.

A jacket for a conducting wire that is the product of any of the methods in this section is provided, the jacket having enhanced abrasion resistance, enhanced heat resistance, and a level of extractable fluoride ions that is less than about 150 ppm w/w. A primary insulator for a conducting wire that is the product of any of the methods in this section is provided, the primary insulator having enhanced abrasion resistance, enhanced heat resistance, and a level of extractable fluoride ions that is less than about 150 ppm w/w.

E. Concentrate for Making a Crosslinked ETFE Copolymer

The compositions provided in this disclosure may be prepared from a concentrated "masterbatch." A general embodiment of the concentrate comprises an ETFE carrier resin and a metal oxide fluoride ion scavenger at a concentration of at least 10% w/w. In some embodiments, the metal oxide concentration is about 12.5-50% w/w. In further embodiments the metal oxide concentration is about 50% w/w. The metal oxide may be any that is disclosed as being suitable for the composition above.

The concentrate is used by diluting it down in ETFE diluent until the metal oxide is within the desired range. A method of making a crosslinked ETFE is provided, the method comprising: providing the concentrate above; diluting the concentrate with diluent ETFE to the point at which the metal oxide concentration is about 0.1-10% w/w, to make a diluted composition; and exposing the diluted composition to at least 5 Mrad (50 kGy) ionizing radiation; wherein the level of extractable fluoride ions in the crosslinked ETFE copolymer is less than about 150 ppm w/w. In some embodiments of the method, the concentrate is diluted to the point at which the metal oxide concentration is about 0.1-8% w/w. In further embodiments of the method, the concentrate is diluted to the point at which the metal oxide concentration is at least about 2.5% w/w. In still further embodiments of the method, the concentrate is diluted to the point at which the metal oxide concentration is about 2.5-5.0% w/w. In a specific embodiment of the method, the concentrate is diluted to the point at which the metal oxide concentration is about 5% w/w.

In some embodiments of the method the ETFE diluent comprises a crosslinking agent. The crosslinking agent may be any of the crosslinking agents disclosed above as suitable in the composition, such as TAIC. In other embodiments of the method the crosslinking agent may be added to the diluted composition. In any such embodiments, the TAIC may be present in the diluted composition at a concentration of about 1-10% w/w. In further embodiments, the TAIC may be present in the diluted composition at a concentration of about 3-7% w/w. In still further embodiments the TAIC may be present in the diluted composition at a concentration of about 5% w/w.

F. Working Example

Seven ETFE compositions were prepared to test the ability of three metal oxides to scavenge fluoride ions during radiologic crosslinking of the ETFE. All of the compositions contained 5% w/w of TAIC as a crosslinking agent. A control was prepared without metal oxide. Three metal oxides were tested: antimony trioxide ($Sb_2O_3$), zinc oxide (ZnO), and magnesium oxide (MgO). Two sets of duplicate test samples were prepared for each oxide, one set at 2.5% w/w oxide and another set at 5% w/w oxide. The compositions of each sample are summarized in the table below:

TABLE 1

Compositions of Test Samples

| Sample Reference | ETFE (w/w) | TAIC (w/w) | $Sb_2O_3$ (w/w) | ZnO (% w/w) | MgO (% w/w) |
|---|---|---|---|---|---|
| A | 95% | 5% | 0% | 0% | 0% |
| B | 92.5% | 5% | 2.5% | 0% | 0% |
| C | 90% | 5% | 5% | 0% | 0% |
| D | 92.5% | 5% | 0% | 2.5% | 0% |
| E | 90% | 5% | 0% | 5% | 0% |
| F | 92.5% | 5% | 0% | 0% | 2.5% |
| G | 90% | 5% | 0% | 0% | 5% |

The ETFE compositions listed in Table 1 were prepared at Colorant Chromatics (Bethel, Conn.). The samples in pellet form were then compression molded at PBY Plastics (Ontario, Calif.) into sheets with a dimension of about 6" (15.24 cm) by 6" (15.24 cm) by 1/16" (1.59 mm). These samples in sheet form were then sent to E-BEAM, Inc. (Lebanon, Ohio) for electron beam exposure experiments. For each ETFE composition, two levels of electron beam exposure dosages were used: 10 Mrad and 20 Mrad. After electron beam exposure, a die cutter was used to cut out two small pieces from each composition to perform the extraction test.

Each piece was weighed before being placed into a 60 mL polypropylene wide-mouth bottle. The weight of each cut piece was approximately 1.0-1.2 g. 20 mL of deionized water was introduced into each wide-mouth bottle using a pipette. Each wide mouth bottle was tightly capped then placed inside an oven at 70° C. for 7 days (168 hours). After the samples cooled down to room temperature, 20 mL of "total ionic strength adjustment buffer 2" (or TISAB II from Ricca Chemical Company, Arlington, Tex.) was added into each bottle. The fluoride ion concentration determination was carried out using a fluoride ion selective electrode or ISE (Model DC219-F by Mettler-Toledo, Columbus, Ohio).

The ion selective electrode was connected to a multi-purpose pH meter (Model Seven Multi made by Mettler-Toledo, Columbus, Ohio) for measurements. The manufacturer's recommended procedure was followed to calibrate the electrode using commercially obtained fluoride standards (Thermo-Fisher Scientific, Chelmsford, Mass.). After the fluoride concentration was determined for each composition (replica of two), the average value for each composition was calculated. The value determined by this method is expressed in terms of $\mu g\ mL^{-1}$. Due to variations in sample weight, the data were converted into units of μg fluoride (g of sample)$^{-1}$ for comparison. As can be seen from the results shown in Table 2 below, addition of 2.5% w/w of either ZnO (sample D) or MgO (sample F) dramatically reduced the extractable fluoride ion contents by as much as 99%. Note that antimony trioxide, while having some ability to scavenge fluoride ions under these conditions, did not provide the same dramatic levels of reduction provided by ZnO and MgO.

TABLE 2

Extractable Fluoride After Radiologic Crosslinking

| Metal Oxide | Concentration (w/w) | 0 Mrad (ppm F, w/w) | 10 Mrad (ppm F, w/w) | 20 Mrad (ppm F, w/w) |
|---|---|---|---|---|
| $Sb_2O_3$ | 2.5% | 4.6 | 187.2 | 257.2 |
| $Sb_2O_3$ | 5% | 5.0 | 171.3 | 236.6 |
| ZnO | 2.5% | 2.2 | 8.1 | 11.9 |
| ZnO | 5% | 2.1 | 7.0 | 8.8 |
| MgO | 2.5% | 2.9 | 4.1 | 8.3 |
| MgO | 5% | 2.6 | 4.5 | 7.1 |
| Control | | 3.4 | 743.8 | 1228.6 |

At 10 Mrad, the samples containing MgO have extractable fluoride ions that are only marginally above baseline (0 Mrad).

Figure 1:
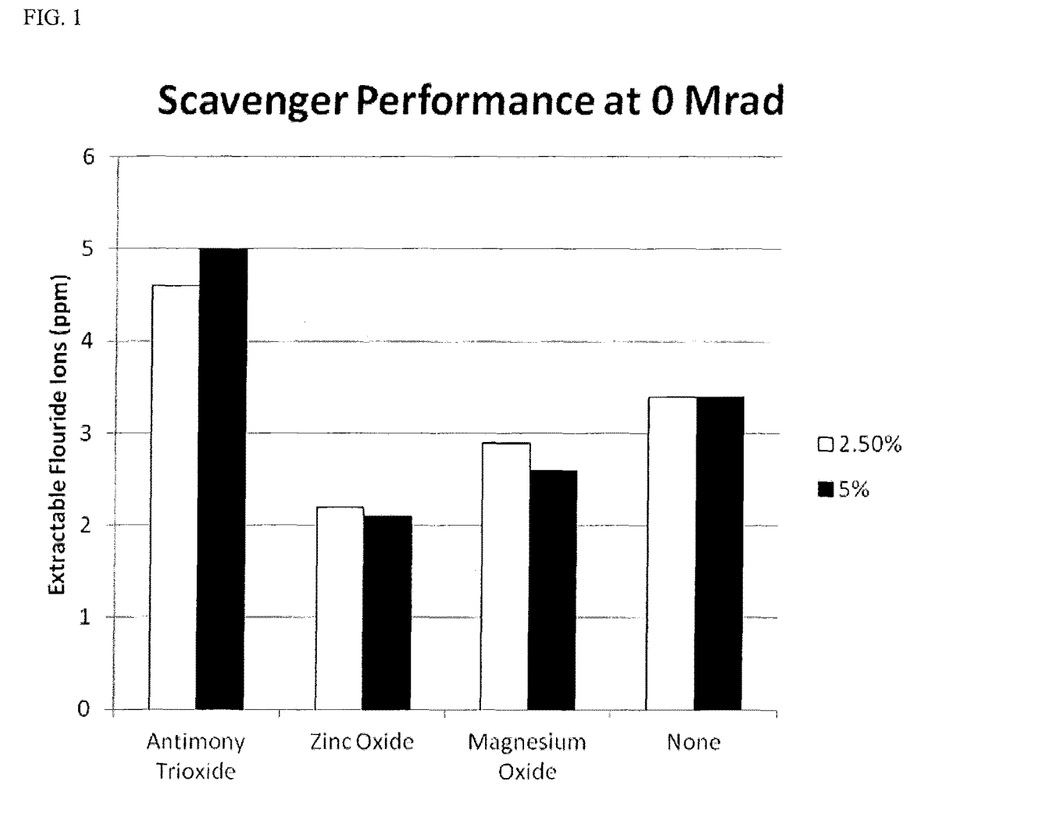
FIG. 1: A graph showing concentrations of extractable fluoride ions from seven ETFE compositions that were not exposed to ionizing radiation (0 Mrad).
Figure 2:
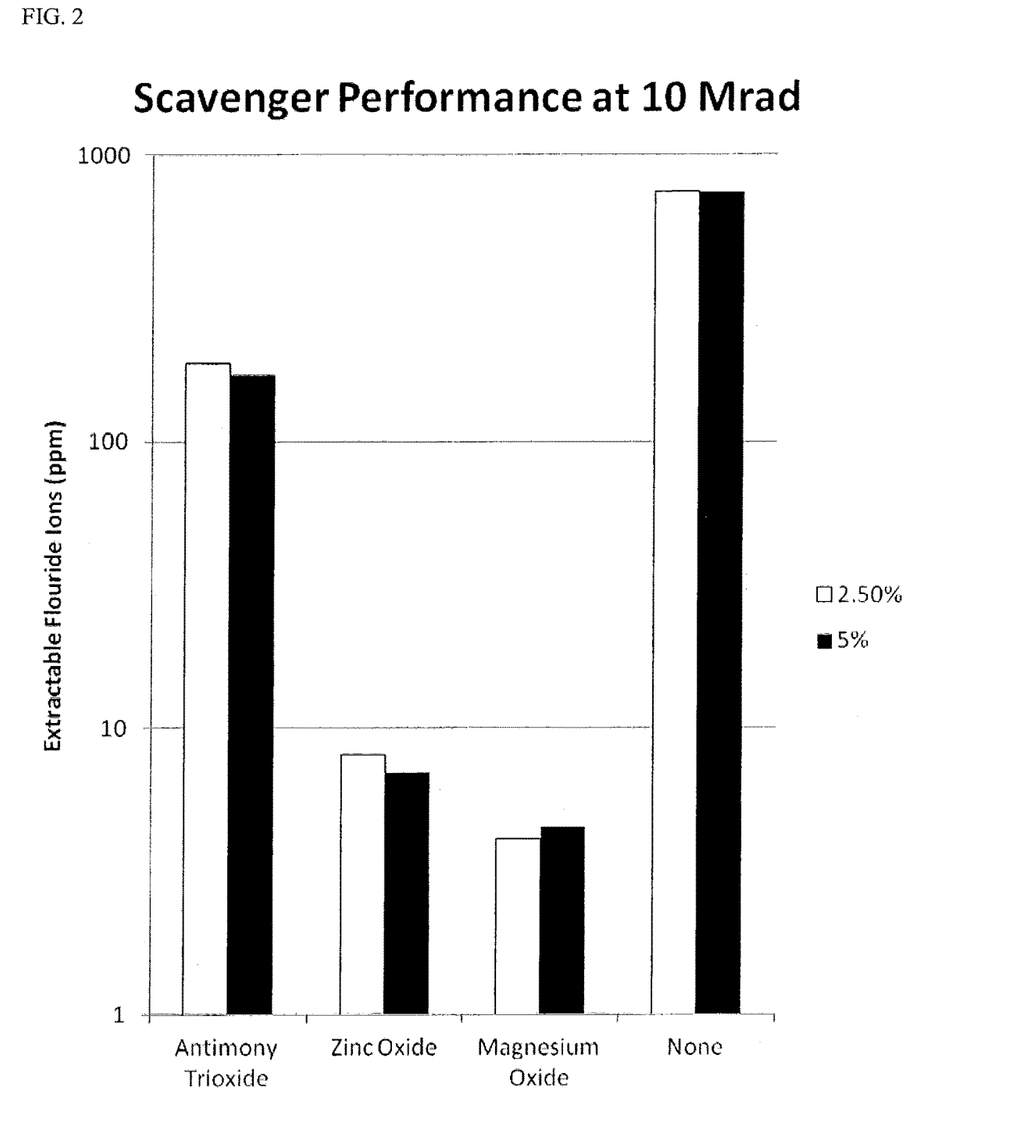
FIG. 2: A graph showing concentrations of extractable fluoride ions from seven ETFE compositions after exposure to 10 Mrad of high-energy electron radiation.

As can be seen in FIG. 1, in the absence of irradiation none of the samples contained more than 5 ppm w/w extractable fluoride. Turning now to FIG. 2 (note the log scale), it can be seen that after irradiation at 10 Mrad magnesium oxide at both concentrations reduced the amount of extractable fluoride ions by over 99.4%. Zinc oxide at 2.5% w/w and 5% w/w reduced extractable fluoride ions by 98.9% and 99.1%, respectively. In contrast, antimony trioxide at 2.5 and 5% w/w reduced extractable fluoride ions by a lesser extent (74.8% and 77.0%, respectively).

Figure 3:
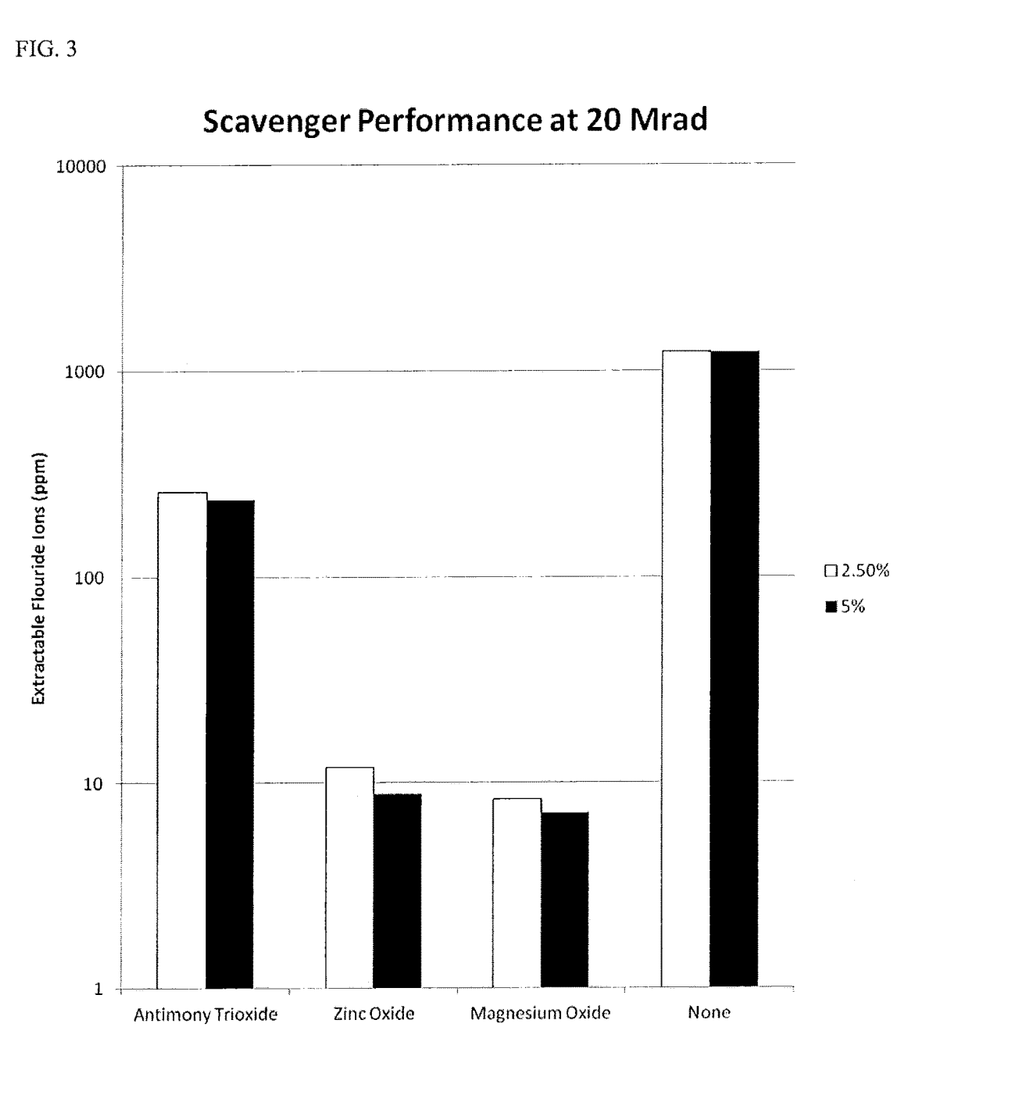
FIG. 3: A graph showing concentrations of extractable fluoride ions from seven ETFE compositions after exposure to 20 Mrad of high-energy electron radiation.

As can be seen in FIG. 3, when the dosage of ionizing radiation was increased to 20 Mrad, the magnesium oxide at both concentrations scavenged a comparable fraction of the fluoride ions as it did at 10 Mrad (about 99.3 and 99.4% w/w respectively at 2.5 and 5% w/w). The scavenging efficiency of ZnO slightly increased when the dosage of ionizing radiation was increased to 20 Mrad; at 20 Mrad the scavenging efficiency of ZnO was 99.0% at 2.5% w/w and 99.3% at 5% w/w. At 20 Mrad antimony trioxide showed markedly lower scavenging efficiencies than either of ZnO or MgO, having scavenging efficiencies of 79.1% at 2.5% w/w and 80.7% at 5% w/w.

Moreover, at both radiation doses antimony trioxide was unable to maintain extractable fluoride at a level that is practical for using the ETFE copolymer with metallic structures such as wire, which are generally considered to be below about 80 ppm w/w.

G. Conclusions

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. §1.77 or otherwise to provide organizational queues. These headings shall not limit or characterize the invention(s) set forth herein.

We claim:

1. A composition for manufacturing a crosslinked ethylene tetrafluoroethylene (ETFE) copolymer with enhanced abrasion resistance and heat resistance, the composition consisting of: (a) at least about 70% w/w ETFE; (b) about 0.1-10% w/w of a metal oxide selected from the group consisting of ZnO and MgO; (c) a crosslinking agent; and optionally (d) a pigment.

2. A method of making a crosslinked ethylene tetrafluoroethylene (ETFE) copolymer with enhanced abrasion resistance and heat resistance, the method comprising: (a) providing the composition of claim 1; and (b) exposing the composition to at least about 5 Mrad (50 kGy) ionizing radiation; wherein the level of extractable fluoride ions in the crosslinked ETFE copolymer is less than about 150 ppm w/w.

3. A method of making a jacket for a conducting wire with enhanced abrasion resistance and heat resistance, the method comprising: (a) providing the composition of claim 1; (b) extruding the composition into the shape of the jacket; and (c) crosslinking the composition by exposing the composition to at least about 5 Mrad (50 kGy) ionizing radiation to produce a crosslinked ETFE copolymer; wherein the level of extractable fluoride ions in the crosslinked ETFE copolymer is less than about 150 ppm w/w.

4. A method of making a primary insulator for a conducting wire with enhanced abrasion resistance and heat resistance, the method comprising: (a) providing the composition of claim 1; (b) applying the composition to the wire; and (c) crosslinking the composition by exposing the composition to at least about 5 Mrad (50 kGy) ionizing radiation to produce a crosslinked ETFE copolymer; wherein the level of extractable fluoride ions in the crosslinked ETFE copolymer is less than about 150 ppm w/w.

5. The method of claim 2, in which the crosslinking agent is triallyl isocyanurate (TRIC).

6. The method of claim 2, in which the crosslinking agent is triallyl isocyanurate (TRIC) and is present at a concentration of about 1-10% w/w.

7. The method of claim 2, in which the metal oxide is present at a concentration of about 0.1-8% w/w.

8. The method of claim 2, in which the metal oxide is MgO present at a concentration of about 2.5-5.0% w/w.

9. The method of claim 2, in which the metal oxide is ZnO present at a concentration of about 2.5-5.0% w/w.

10. The method of claim 2, in which the ionizing radiation is electron radiation.

11. The method of claim 2, in which the ionizing radiation is high-energy electron radiation of at least about 0.1 MeV.

12. The method of claim 2, in which the ionizing radiation is γ radiation.

13. The method of claim 2, in which the composition is exposed to about 5-25 Mrad (50-250 kGy) of the ionizing radiation.

14. The method of claim 2, in which the composition comprises a pigment that retains its pigmenting characteristics after exposure to at least about 5 Mrad (50 kGy).

15. The method of claim 2, in which the composition comprises a $TiO_2$ pigment.

16. The method of claim 2, in which the level of extractable fluoride ions in the crosslinked ETFE copolymer is less than about 80 ppm w/w.

17. The method of claim 2, in which the level of extractable fluoride ions in the crosslinked ETFE copolymer is less than about 10 ppm w/w.

18. The method of claim 2, in which the composition comprises: about 2.5-5% w/w of the metal oxide; and about 5% w/w triallyl isocyanurate as the crosslinking agent.

19. The crosslinked ETFE copolymer that is the product of the method of claim 2, the copolymer having enhanced abrasion resistance, enhanced heat resistance, and a level of extractable fluoride ions that is less than about 150 ppm w/w.

20. The crosslinked ETFE copolymer of claim 19, having a level of extractable fluoride ions that is less than about 80 ppm w/w.

21. The crosslinked ETFE copolymer of claim 19, having a level of extractable fluoride ions that is less than about 10 ppm w/w.

22. A method of making a crosslinked ethylene tetrafluoroethylene (ETFE) copolymer with enhanced abrasion resistance and heat resistance, the method comprising: (a) providing the composition of claim 1; and (b) exposing the composition to about 10-20 Mrad (100-200 kGy) ionizing radiation; wherein the level of extractable fluoride ions in the crosslinked ETFE copolymer is less than about 60 ppm w/w.

23. A jacketed conducting wire comprising a conducting wire jacketed with a jacket, the jacket comprising the crosslinked ETFE copolymer of claim 19.

24. An insulated conducting wire comprising a conducting wire coated with a primary insulator, the primary insulator comprising the crosslinked ETFE copolymer of claim 19.

* * * * *

UNITED STATES PATENT AND TRADEMARK OFFICE
CERTIFICATE OF CORRECTION

Page 1 of 1

PATENT NO. : 9,728,298 B2
APPLICATION NO. : 14/751345
DATED : August 8, 2017
INVENTOR(S) : Keith S. Shih, Ronald E. Hendershot and George Lin It is certified that error appears in the above-identified patent and that said Letters Patent is hereby corrected as shown below:

On the Title Page

Please replace item (75) (inventors) with the following:
"Inventors: Keith S Shih, Madison, AL (US)
　　　　　　Ronald E Hendershot, Decatur, AL (US)
　　　　　　George Lin, Bayville, NY (US)"

Signed and Sealed this
Eleventh Day of June, 2019

Andrei Iancu
*Director of the United States Patent and Trademark Office*